US012649192B2

(12) United States Patent
Kour et al.

(10) Patent No.: US 12,649,192 B2
(45) Date of Patent: Jun. 9, 2026

(54) TRACK SAW

(71) Applicant: MILWAUKEE ELECTRIC TOOL CORPORATION, Brookfield, WI (US)

(72) Inventors: Austin H. Kour, Saukville, WI (US); Brett J. VanDaalwyk, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 446 days.

(21) Appl. No.: 18/122,999

(22) Filed: Mar. 17, 2023

(65) Prior Publication Data

US 2023/0294184 A1      Sep. 21, 2023

Related U.S. Application Data

(60) Provisional application No. 63/321,385, filed on Mar. 18, 2022.

(51) Int. Cl.
B23D 47/02        (2006.01)
B23D 59/00        (2006.01)
B27G 19/04        (2006.01)

(52) U.S. Cl.
CPC ........... B23D 47/02 (2013.01); B23D 59/007 (2013.01); B27G 19/04 (2013.01)

(58) Field of Classification Search
CPC .... B23D 47/02; B23D 59/007; B23D 59/006; B27G 19/04; B27B 9/00; B27B 9/04; B23Q 11/0046; B23Q 11/08; Y10T 83/207
See application file for complete search history.

(56) References Cited

U.S. PATENT DOCUMENTS

| | | | |
|---|---|---|---|
| 1,888,679 A | 11/1932 | Walter | |
| 1,911,045 A | 5/1933 | Tinnen | |
| 1,932,511 A | 10/1933 | Clarke | |
| 2,346,961 A | 4/1944 | Gundelfinger et al. | |

(Continued)

FOREIGN PATENT DOCUMENTS

| | | | |
|---|---|---|---|
| AU | 2010101055 A4 | 11/2010 | |
| CN | 201067843 Y | 6/2008 | |

(Continued)

OTHER PUBLICATIONS

EP_0810071_B1_ (Year: 2004).*

(Continued)

*Primary Examiner* — Jonathan G Riley
(74) *Attorney, Agent, or Firm* — Michael Best & Friedrich LLP

(57)                ABSTRACT

A circular saw comprising a shoe including an upper surface and an opposite, lower surface, and a saw unit. The saw unit includes a circular saw blade, a blade guard, and a transparent blade window. The blade guard encloses a portion of the saw blade. The blade guard encloses a portion of the saw blade and has a cutout adjacent a bottom side of the blade guard and a slot above the cutout. The transparent blade window is configured to be received in the cutout to provide a user with a visual indication of the saw blade. The blade window includes a lock tab confined for sliding movement within a first portion of the slot and removable from the slot when aligned with a second portion of the slot to remove the blade window from the blade guard.

20 Claims, 7 Drawing Sheets

(56)        References Cited

U.S. PATENT DOCUMENTS

| | | | |
|---|---|---|---|
| 2,629,410 A | 2/1953 | Edward | |
| 2,677,399 A | 5/1954 | Getsinger | |
| 2,818,892 A | 1/1958 | Price | |
| 2,819,742 A | 1/1958 | Blachly | |
| 2,854,043 A | 9/1958 | Ray | |
| 2,929,419 A | 3/1960 | Johnson | |
| 3,011,530 A | 12/1961 | Ellard | |
| 3,298,407 A | 1/1967 | Scott | |
| 3,450,177 A | 6/1969 | Siegal et al. | |
| 3,586,077 A | 6/1971 | Pease | |
| 3,623,518 A | 11/1971 | Nicotra | |
| 3,645,307 A | 2/1972 | Stocker | |
| 3,730,042 A | 5/1973 | Price | |
| 3,830,130 A | 8/1974 | Moore | |
| 3,991,643 A | 11/1976 | Girardin | |
| 4,058,150 A | 11/1977 | Pennington | |
| 4,059,038 A | 11/1977 | Rietema | |
| 4,078,309 A | 3/1978 | Wilson | |
| 4,176,572 A | 12/1979 | Pennington | |
| 4,202,233 A | 5/1980 | Larson | |
| 4,224,855 A | 9/1980 | Des Roches | |
| 4,245,390 A | 1/1981 | Bond | |
| 4,253,362 A * | 3/1981 | Olson | B23D 59/006 |
| | | | 83/100 |
| 4,307,513 A | 12/1981 | Genge | |
| 4,353,165 A | 10/1982 | Albery | |
| 4,356,748 A | 11/1982 | Tilton | |
| 4,381,103 A | 4/1983 | Ferdinand et al. | |
| 4,418,902 A | 12/1983 | Genge | |
| 4,450,627 A * | 5/1984 | Morimoto | B27G 19/04 |
| | | | 83/520 |
| 4,453,438 A | 6/1984 | Zelli | |
| 4,463,644 A | 8/1984 | Ferdinand et al. | |
| 4,539,881 A | 9/1985 | Maier | |
| 4,607,555 A | 8/1986 | Erhard | |
| 4,619,170 A | 10/1986 | Maier et al. | |
| 4,628,608 A | 12/1986 | Kuhlmann et al. | |
| 4,677,750 A | 7/1987 | Maier et al. | |
| 4,694,720 A | 9/1987 | Brickner, Jr. et al. | |
| 4,751,865 A | 6/1988 | Buckalew | |
| 4,777,726 A | 10/1988 | Flowers | |
| 4,856,394 A | 8/1989 | Clowers | |
| 4,919,384 A | 4/1990 | Grimberg | |
| 4,999,916 A | 3/1991 | Sistare | |
| 5,010,651 A | 4/1991 | Techter et al. | |
| 5,062,339 A | 11/1991 | Campos | |
| 5,075,976 A | 12/1991 | Young | |
| 5,136,910 A | 8/1992 | Kuhn et al. | |
| 5,138,759 A | 8/1992 | Gruetzmacher | |
| 5,201,863 A | 4/1993 | Peot | |
| 5,206,999 A | 5/1993 | Stone | |
| 5,235,753 A | 8/1993 | Stumpf | |
| 5,239,756 A | 8/1993 | Matzo et al. | |
| 5,271,155 A | 12/1993 | Fuchs et al. | |
| 5,287,779 A | 2/1994 | Metzger, Jr. | |
| 5,287,780 A | 2/1994 | Metzger, Jr. et al. | |
| 5,365,822 A | 11/1994 | Stapleton et al. | |
| 5,381,602 A | 1/1995 | Matzo et al. | |
| 5,398,456 A | 3/1995 | Kleider | |
| 5,427,006 A | 6/1995 | Finley | |
| 5,452,515 A | 9/1995 | Schilling | |
| 5,454,167 A | 10/1995 | Albery | |
| 5,540,129 A | 7/1996 | Kalber et al. | |
| 5,561,907 A | 10/1996 | Campbell et al. | |
| 5,570,511 A | 11/1996 | Reich et al. | |
| 5,669,371 A | 9/1997 | Rupprecht et al. | |
| 5,675,898 A | 10/1997 | Kalber et al. | |
| 5,676,126 A | 10/1997 | Rupprecht et al. | |
| 5,678,314 A | 10/1997 | Braunbach et al. | |
| 5,794,351 A | 8/1998 | Campbell et al. | |
| 5,815,933 A | 10/1998 | Staniszewski | |
| 5,822,864 A | 10/1998 | Campbell et al. | |
| 5,911,482 A | 6/1999 | Campbell et al. | |
| 6,055,734 A * | 5/2000 | McCurry | B27B 9/00 |
| | | | 83/520 |
| 6,094,827 A * | 8/2000 | Campbell | B23D 59/002 |
| | | | 83/520 |
| 6,108,912 A * | 8/2000 | Radigan | B23Q 11/08 |
| | | | 30/390 |
| 6,108,916 A | 8/2000 | Zeiler et al. | |
| 6,142,051 A | 11/2000 | Garuglieri | |
| 6,202,311 B1 | 3/2001 | Nickels, Jr. | |
| 6,237,230 B1 | 5/2001 | Campbell et al. | |
| 6,276,064 B1 | 8/2001 | Campbell | |
| 6,301,790 B1 | 10/2001 | Zeiler et al. | |
| 6,367,790 B2 | 4/2002 | Ocklenburg et al. | |
| 6,375,557 B1 | 4/2002 | Spangenberg et al. | |
| 6,397,716 B1 | 6/2002 | Garuglieri | |
| 6,412,179 B1 | 7/2002 | Ende | |
| 6,502,316 B2 | 1/2003 | Campbell et al. | |
| 6,543,143 B2 | 4/2003 | Moore et al. | |
| 6,574,874 B2 | 6/2003 | Hartmann | |
| 6,588,112 B2 | 7/2003 | Zeiler et al. | |
| 6,591,509 B2 | 7/2003 | LeBlanc | |
| 6,601,305 B1 | 8/2003 | Fukuoka | |
| 6,681,493 B2 | 1/2004 | Mori et al. | |
| 6,691,418 B1 | 2/2004 | Lewin et al. | |
| 6,708,411 B2 | 3/2004 | Kani | |
| 6,758,123 B2 | 7/2004 | Svetlik et al. | |
| 6,848,683 B2 | 2/2005 | Foshag et al. | |
| 6,878,050 B2 | 4/2005 | Wendt et al. | |
| 6,886,259 B2 | 5/2005 | Kani | |
| 6,945,523 B2 | 9/2005 | Degen | |
| 6,953,394 B2 | 10/2005 | Wendt et al. | |
| 6,991,009 B1 | 1/2006 | Wedeward | |
| 7,039,548 B2 | 5/2006 | Takano et al. | |
| 7,073,266 B2 | 7/2006 | Moore et al. | |
| 7,093,828 B2 | 8/2006 | Murray et al. | |
| 7,096,588 B2 | 8/2006 | Zeiler et al. | |
| 7,114,714 B2 | 10/2006 | Wong | |
| 7,191,526 B2 | 3/2007 | Zeiler et al. | |
| 7,198,042 B2 | 4/2007 | Harris | |
| 7,219,434 B2 | 5/2007 | Moore et al. | |
| 7,219,885 B2 | 5/2007 | Nardozza | |
| 7,249,548 B2 | 7/2007 | Blanco et al. | |
| 7,281,332 B2 | 10/2007 | Niwa et al. | |
| 7,300,339 B2 | 11/2007 | Gaul et al. | |
| 7,308,764 B2 | 12/2007 | Zeiler et al. | |
| 7,434,321 B2 | 10/2008 | Niwa et al. | |
| 7,458,301 B2 | 12/2008 | Yu | |
| 7,497,152 B2 | 3/2009 | Zeiler et al. | |
| 7,516,551 B2 | 4/2009 | Yoshida | |
| 7,523,691 B2 | 4/2009 | Terashima et al. | |
| 7,549,229 B2 | 6/2009 | Aoyama et al. | |
| 7,555,976 B2 | 7/2009 | Logan et al. | |
| 7,562,456 B2 | 7/2009 | Roehm et al. | |
| 7,621,206 B2 | 11/2009 | Makropoulos | |
| D612,715 S | 3/2010 | Weinberg et al. | |
| 7,757,592 B2 | 7/2010 | Wilson | |
| 7,778,796 B2 | 8/2010 | Takano et al. | |
| 7,823,293 B2 | 11/2010 | Walmsley et al. | |
| 7,850,154 B2 | 12/2010 | Feuge | |
| 7,856,723 B2 | 12/2010 | Thomas et al. | |
| 7,866,051 B2 | 1/2011 | Niwa | |
| 7,896,323 B2 | 3/2011 | Murray et al. | |
| 7,905,166 B2 | 3/2011 | Thomas et al. | |
| 7,908,952 B2 | 3/2011 | Wilson et al. | |
| 7,926,397 B2 | 4/2011 | Logan et al. | |
| 7,958,641 B1 | 6/2011 | Ende | |
| 7,975,388 B2 | 7/2011 | Fuchs et al. | |
| 8,056,243 B2 | 11/2011 | Sargeant et al. | |
| 8,060,235 B2 | 11/2011 | Johnson et al. | |
| 8,061,043 B2 | 11/2011 | Allen et al. | |
| 8,061,344 B2 * | 11/2011 | Dofher | B28D 7/02 |
| | | | 125/38 |
| 8,181,559 B1 | 5/2012 | End | |
| 8,201,483 B2 | 6/2012 | Wilson | |
| 8,209,872 B1 | 7/2012 | Ende | |
| 8,220,372 B2 | 7/2012 | Janson | |
| 8,230,768 B2 | 7/2012 | Ozawa et al. | |
| 8,267,389 B2 | 9/2012 | Roesch et al. | |
| 8,272,133 B2 | 9/2012 | Wascow | |
| 8,313,095 B2 | 11/2012 | Kloepfer et al. | |
| 8,359,959 B2 | 1/2013 | Aoyama et al. | |

(56)　　　　　References Cited

U.S. PATENT DOCUMENTS

| | | | |
|---|---|---|---|
| 8,439,339 | B2 | 5/2013 | Roesch et al. |
| 8,479,401 | B2 | 7/2013 | Barkley |
| 8,485,078 | B2 | 7/2013 | Janson |
| 8,588,959 | B2 | 11/2013 | Johnson et al. |
| 8,616,108 | B2 | 12/2013 | Lukas et al. |
| 8,640,346 | B2 | 2/2014 | Allen et al. |
| 8,641,024 | B1 | 2/2014 | Murray et al. |
| 8,661,957 | B2 | 3/2014 | Aoyama et al. |
| 8,671,811 | B2 | 3/2014 | Rybka |
| 8,684,052 | B2 | 4/2014 | Breitenbach |
| 8,985,566 | B2 | 3/2015 | Chuang |
| 9,038,516 | B2 | 5/2015 | Chen et al. |
| 9,044,869 | B2 | 6/2015 | Xing et al. |
| 9,156,184 | B2 | 10/2015 | Stoffel |
| 9,308,626 | B2 | 4/2016 | Chuang |
| 9,427,848 | B1 | 8/2016 | Murray et al. |
| 9,475,140 | B2 | 10/2016 | Kume et al. |
| 9,522,479 | B2 | 12/2016 | Boehme et al. |
| 9,623,583 | B2 | 4/2017 | Sinzig et al. |
| 9,744,650 | B2 | 8/2017 | Kregloski |
| 9,751,139 | B2 | 9/2017 | Groth |
| 9,908,256 | B2 | 3/2018 | Sinzig et al. |
| 9,937,638 | B2 | 4/2018 | Numata |
| 9,981,402 | B2 | 5/2018 | Cuenca |
| 10,005,199 | B2 | 6/2018 | Sinzig et al. |
| 10,099,398 | B2 | 10/2018 | Wang |
| D846,365 | S | 4/2019 | Wang |
| 10,272,544 | B1 | 4/2019 | Murray et al. |
| 10,363,682 | B2 | 7/2019 | Firth |
| 10,442,058 | B2 | 10/2019 | Wang |
| 10,456,944 | B2 | 10/2019 | Ursell et al. |
| 10,471,624 | B2 | 11/2019 | Baxivanelis |
| 10,486,251 | B2 | 11/2019 | Nakashima |
| 10,518,343 | B2 | 12/2019 | Ogino et al. |
| 2001/0000552 | A1* | 5/2001 | Watson ................ B23D 45/16 |
| | | | 30/375 |
| 2001/0022027 | A1 | 9/2001 | Campbell et al. |
| 2003/0233925 | A1 | 12/2003 | Makropoulos |
| 2003/0233926 | A1 | 12/2003 | Makropoulos |
| 2004/0134076 | A1* | 7/2004 | Moore ................ B23D 45/16 |
| | | | 30/166.3 |
| 2005/0061128 | A1 | 3/2005 | Caughlin et al. |
| 2006/0011032 | A1 | 1/2006 | Brown et al. |
| 2006/0011034 | A1 | 1/2006 | Gehret et al. |
| 2006/0067798 | A1* | 3/2006 | Neumeier ............ B23Q 11/06 |
| | | | 407/66 |
| 2006/0086219 | A1 | 4/2006 | Zeiler et al. |
| 2006/0107536 | A1 | 5/2006 | Buck et al. |
| 2006/0117579 | A1 | 6/2006 | Zeiler et al. |
| 2006/0117920 | A1 | 6/2006 | Zeiler et al. |
| 2006/0191387 | A1 | 8/2006 | Weber et al. |
| 2006/0283024 | A1 | 12/2006 | Wilson et al. |
| 2007/0007702 | A1 | 1/2007 | Brandl |
| 2007/0093189 | A1* | 4/2007 | Gaul .................... B24B 55/052 |
| | | | 451/451 |
| 2007/0144319 | A1 | 6/2007 | Jones |
| 2007/0157781 | A1 | 7/2007 | Wilson et al. |
| 2007/0157782 | A1 | 7/2007 | Hetcher et al. |
| 2007/0180710 | A1* | 8/2007 | Moore ................ B27G 19/04 |
| | | | 30/391 |
| 2007/0222130 | A1 | 9/2007 | Leinbach et al. |
| 2008/0041209 | A1 | 2/2008 | Li |
| 2009/0126206 | A1 | 5/2009 | Chung et al. |
| 2009/0133559 | A1 | 5/2009 | Sargeant et al. |
| 2009/0308218 | A1 | 12/2009 | Raff et al. |
| 2010/0156015 | A1 | 6/2010 | Klein et al. |
| 2011/0025265 | A1 | 2/2011 | Mochida et al. |
| 2011/0072943 | A1 | 3/2011 | Chen |
| 2011/0083540 | A1 | 4/2011 | Xing et al. |
| 2011/0219628 | A1 | 9/2011 | Harrison et al. |
| 2012/0079931 | A1 | 4/2012 | Hansen |
| 2012/0132049 | A1 | 5/2012 | Bokelaar |
| 2012/0247299 | A1 | 10/2012 | Wilson |

| | | | |
|---|---|---|---|
| 2012/0285305 | A1* | 11/2012 | Jablonsky .............. B23D 51/02 |
| | | | 83/745 |
| 2014/0026725 | A1 | 1/2014 | Makropoulos |
| 2014/0047967 | A1 | 2/2014 | Makropoulos |
| 2014/0103595 | A1 | 4/2014 | Yang |
| 2014/0290458 | A1* | 10/2014 | Sinzig ................. B25H 1/0078 |
| | | | 83/477.2 |
| 2014/0345436 | A1 | 11/2014 | Behrisch |
| 2015/0047484 | A1 | 2/2015 | Lane |
| 2015/0059186 | A1 | 3/2015 | Bermes et al. |
| 2015/0135922 | A1 | 5/2015 | Bokelaar |
| 2015/0321374 | A1 | 11/2015 | Ursell et al. |
| 2015/0375389 | A1 | 12/2015 | Semann |
| 2016/0243631 | A1 | 8/2016 | Brewster et al. |
| 2016/0279764 | A1 | 9/2016 | Thomas |
| 2017/0120353 | A1 | 5/2017 | Tennant et al. |
| 2017/0159793 | A1 | 6/2017 | Schorpp et al. |
| 2017/0348829 | A1 | 12/2017 | Kregloski |
| 2018/0071955 | A1 | 3/2018 | Rybka et al. |
| 2018/0093335 | A1 | 4/2018 | Hart |
| 2018/0290328 | A1 | 10/2018 | Zuler |
| 2018/0345523 | A1 | 12/2018 | Ursell et al. |
| 2018/0361612 | A1 | 12/2018 | Wang |
| 2019/0039258 | A1 | 2/2019 | Lee |
| 2019/0044415 | A1 | 2/2019 | Hatfield et al. |
| 2019/0076940 | A1 | 3/2019 | Crabb et al. |
| 2019/0091779 | A1 | 3/2019 | Crabb et al. |
| 2019/0143555 | A1 | 5/2019 | Nakashima |
| 2019/0217446 | A1 | 7/2019 | Wang |
| 2019/0217447 | A1 | 7/2019 | Wang |
| 2019/0232400 | A1 | 8/2019 | Ender |
| 2019/0329337 | A1 | 10/2019 | Owens et al. |
| 2019/0381632 | A1 | 12/2019 | Wang et al. |
| 2019/0388984 | A1 | 12/2019 | Kuragano |
| 2020/0023541 | A1 | 1/2020 | Strempke et al. |
| 2020/0086405 | A1 | 3/2020 | Ogino et al. |
| 2020/0180117 | A1 | 6/2020 | Kloepfer et al. |
| 2020/0398454 | A1 | 12/2020 | Zsuponyo |
| 2022/0161455 | A1 | 5/2022 | VanDaalwyk et al. |
| 2023/0158586 | A1 | 5/2023 | Rau et al. |

FOREIGN PATENT DOCUMENTS

| | | |
|---|---|---|
| CN | 100448635 C | 1/2009 |
| CN | 101537595 B | 4/2011 |
| CN | 102407571 A | 4/2012 |
| CN | 102744458 A | 10/2012 |
| CN | 203031036 U | 7/2013 |
| CN | 203140888 U | 8/2013 |
| CN | 102814549 B | 9/2014 |
| CN | 104511949 A | 4/2015 |
| CN | 204524406 U | 8/2015 |
| CN | 103418842 B | 9/2015 |
| CN | 204914075 U | 12/2015 |
| CN | 205020943 U | 2/2016 |
| CN | 205184946 U | 4/2016 |
| CN | 205200693 U | 5/2016 |
| CN | 105921811 A | 9/2016 |
| CN | 205888243 U | 1/2017 |
| CN | 104722837 B | 4/2017 |
| CN | 206425620 U | 8/2017 |
| CN | 208392223 U | 1/2019 |
| CN | 208614252 U | 3/2019 |
| CN | 209350095 U | 9/2019 |
| CN | 210475706 U | 5/2020 |
| DE | 2413816 A1 | 10/1975 |
| DE | 2542322 A1 | 3/1977 |
| DE | 7820060 U1 | 10/1978 |
| DE | 2829297 A1 | 1/1980 |
| DE | 3007310 C2 | 8/1983 |
| DE | 3315169 A1 | 11/1983 |
| DE | 3308199 A1 | 9/1984 |
| DE | 2547459 C2 | 11/1984 |
| DE | 3420183 A1 | 12/1985 |
| DE | 3434469 A1 | 3/1986 |
| DE | 8604618 U1 | 4/1986 |
| DE | 3500371 A1 | 7/1986 |
| DE | 3540410 A1 | 5/1987 |
| DE | 3609809 A1 | 9/1987 |

(56) References Cited

FOREIGN PATENT DOCUMENTS

| DE | 8706730 U1 | 9/1987 |
|---|---|---|
| DE | 3633655 A1 | 4/1988 |
| DE | 8803627 U1 | 5/1988 |
| DE | 8807584 | 7/1988 |
| DE | 3718232 A1 | 9/1988 |
| DE | 3807516 C1 | 6/1989 |
| DE | 8905442 U1 | 6/1989 |
| DE | 3806814 A1 | 9/1989 |
| DE | 9003772 U1 | 6/1990 |
| DE | 3906300 A1 | 8/1990 |
| DE | 3912307 A1 | 10/1990 |
| DE | 3919702 A1 | 12/1990 |
| DE | 3943134 A1 | 7/1991 |
| DE | 4023101 A1 | 1/1992 |
| DE | 9016090 U1 | 4/1992 |
| DE | 9112286 U1 | 2/1993 |
| DE | 4130174 A1 | 3/1993 |
| DE | 4212460 A1 | 10/1993 |
| DE | 9319867 U1 | 4/1994 |
| DE | 9420679 U1 | 2/1995 |
| DE | 19507062 A1 | 8/1995 |
| DE | 3606525 C2 | 5/1996 |
| DE | 29510061 U1 | 10/1996 |
| DE | 3104733 C3 | 1/1997 |
| DE | 3635159 C2 | 5/1998 |
| DE | 29801989 U1 | 8/1998 |
| DE | 29809921 U1 | 10/1998 |
| DE | 19751599 A1 | 5/1999 |
| DE | 29907474 U1 | 7/1999 |
| DE | 29820244 U1 | 3/2000 |
| DE | 20012674 U1 | 2/2001 |
| DE | 20017862 U1 | 2/2001 |
| DE | 20100087 U1 | 3/2001 |
| DE | 10025077 A1 | 4/2001 |
| DE | 20002160 U1 | 6/2001 |
| DE | 10007294 A1 | 8/2001 |
| DE | 10011740 A1 | 9/2001 |
| DE | 20119603 U1 | 2/2002 |
| DE | 10159485 A1 | 7/2002 |
| DE | 20213291 U1 | 10/2002 |
| DE | 20023085 U1 | 12/2002 |
| DE | 20219273 U1 | 2/2003 |
| DE | 19507286 C2 | 6/2003 |
| DE | 10360373 B3 | 3/2005 |
| DE | 102004017420 A1 | 11/2005 |
| DE | 202006004228 U1 | 6/2006 |
| DE | 102006034136 A1 | 4/2007 |
| DE | 202005019483 U1 | 4/2007 |
| DE | 202006006140 U1 | 8/2007 |
| DE | 102006057951 A1 | 6/2008 |
| DE | 102006060822 A1 | 6/2008 |
| DE | 102008059838 A1 | 6/2010 |
| DE | 102009060088 A1 | 8/2010 |
| DE | 102004002275 B4 | 5/2011 |
| DE | 102006011280 B4 | 8/2011 |
| DE | 10334757 B4 | 2/2012 |
| DE | 102011103476 A1 | 12/2012 |
| DE | 202012009204 U1 | 1/2013 |
| DE | 202013100111 U1 | 2/2013 |
| DE | 102011114375 A1 | 3/2013 |
| DE | 102011116873 A1 | 4/2013 |
| DE | 102011089555 A1 | 6/2013 |
| DE | 102006025137 B4 | 8/2013 |
| DE | 202013104555 U1 | 10/2013 |
| DE | 102005021789 B4 | 3/2014 |
| DE | 202014103166 U1 | 8/2014 |
| DE | 102014010486 A1 | 1/2016 |
| DE | 102015225392 A1 | 6/2017 |
| DE | 202018105381 U1 | 10/2018 |
| DE | 202018107178 U1 | 1/2019 |
| DE | 202018100612 U1 | 5/2019 |
| DE | 102018112324 A1 | 11/2019 |
| EP | 0012404 B1 | 5/1983 |
| EP | 0204023 B1 | 6/1989 |
| EP | 0246417 B1 | 9/1990 |
| EP | 0525437 A2 | 2/1993 |
| EP | 0459121 B1 | 11/1994 |
| EP | 0598088 B1 | 9/1995 |
| EP | 0496047 B1 | 2/1996 |
| EP | 0712686 A1 | 5/1996 |
| EP | 0765716 A1 | 4/1997 |
| EP | 0642896 B1 | 10/1997 |
| EP | 1279467 A1 | 1/2003 |
| EP | 0925893 B1 | 4/2004 |
| EP | 810071 A2 * | 7/2004 |
| EP | 0990492 B1 | 11/2004 |
| EP | 1193036 B1 | 5/2005 |
| EP | 1361019 B1 | 10/2005 |
| EP | 1418018 B1 | 5/2006 |
| EP | 1457299 B1 | 8/2006 |
| EP | 1522394 B1 | 7/2008 |
| EP | 2045055 A2 | 4/2009 |
| EP | 1892056 B1 | 5/2009 |
| EP | 2082832 A2 | 7/2009 |
| EP | 1964648 B1 | 12/2010 |
| EP | 2075080 B1 | 5/2011 |
| EP | 2581166 B1 | 9/2014 |
| EP | 2335892 B1 | 5/2015 |
| EP | 2412499 B1 | 7/2015 |
| EP | 2567796 B1 | 9/2015 |
| EP | 2412489 B1 | 6/2016 |
| EP | 2581167 B1 | 7/2016 |
| EP | 2412486 B1 | 10/2016 |
| EP | 2638997 B1 | 11/2016 |
| EP | 2250005 B1 | 3/2017 |
| EP | 2881228 B1 | 3/2017 |
| EP | 2762282 B1 | 3/2018 |
| EP | 2638995 B1 | 4/2019 |
| EP | 2638996 B1 | 5/2019 |
| EP | 2881229 B1 | 5/2019 |
| EP | 2641710 B1 | 7/2019 |
| FR | 2527497 A1 | 12/1983 |
| GB | 2302058 A | 1/1997 |
| GB | 2362128 A | 11/2001 |
| JP | H0215614 Y2 * | 4/1990 |
| JP | H047101 U | 1/1992 |
| JP | H05318403 A * | 12/1993 ........... B23D 59/002 |
| JP | 2000071120 A | 3/2000 |
| JP | 2007136794 A | 6/2007 |
| JP | 4204749 B2 | 1/2009 |
| JP | 2019030938 A | 2/2019 |
| WO | WO9213672 A1 | 8/1992 |
| WO | WO9301922 A1 | 2/1993 |
| WO | WO9309913 A1 | 5/1993 |
| WO | WO02060642 A1 | 8/2002 |
| WO | WO2003000451 A2 | 1/2003 |
| WO | WO2009095300 A1 | 8/2009 |
| WO | WO2009147152 A1 | 12/2009 |
| WO | WO2011047663 A2 | 4/2011 |
| WO | WO2011085681 A1 | 7/2011 |
| WO | WO2015007032 A1 | 1/2015 |
| WO | WO2015014038 A1 | 2/2015 |
| WO | WO2015036604 A1 | 3/2015 |
| WO | WO2016128232 A1 | 8/2016 |
| WO | WO2016128233 A1 | 8/2016 |
| WO | WO2018148792 A1 | 8/2018 |
| WO | WO2019063685 A1 | 4/2019 |
| WO | WO2019238511 A2 | 12/2019 |
| WO | WO2021116479 A1 | 6/2021 |
| WO | WO2022109381 A1 | 5/2022 |

OTHER PUBLICATIONS

JP_H05318403_A (Year: 1993).*

"Pawl." Merriam-Webster.com Dictionary, Merriam-Webster, https://www.merriam-webster.com/dictionary/pawl. Accessed Jul. 31, 2025.*

JP_H0215614_Y2_ (Year: 1990).*

International Search Report and Written Opinion for Application No. PCT/US2023/015492 dated Jun. 21, 2023 (12 pages).

* cited by examiner

TRACK SAW

CROSS-REFERENCE TO RELATED APPLICATION

This application claims priority to U.S. Provisional Patent Application No. 63/321,385, filed Mar. 18, 2022, the entire content of which is incorporated herein by reference.

FIELD OF THE DISCLOSURE

The present disclosure relates to track saws, and more particularly to track saws including blade windows.

BACKGROUND OF THE DISCLOSURE

Track saws are used to make straight or beveled cuts in a work piece. Typically, track saws are used to make relatively long straight cuts in sheet materials such as wood, plywood, aluminum, steel, and other metals. Such track saws include a track, which is supported on the workpiece, and a saw that translates along the track.

SUMMARY OF THE DISCLOSURE

The disclosure provides, in one aspect, a circular saw comprising a shoe including an upper surface and an opposite, lower surface, and a saw unit. The saw unit includes a circular saw blade, a blade guard, and a transparent blade window. The saw unit is pivotably coupled to the shoe between a first position in which the saw blade does not protrude beyond the lower surface of the shoe, and a second position in which the saw blade protrudes beyond the lower surface of the shoe. The blade guard encloses a portion of the saw blade. The blade guard encloses a portion of the saw blade and has a cutout adjacent a bottom side of the blade guard and a slot above the cutout. The transparent blade window is configured to be received in the cutout to provide a user with a visual indication of the saw blade. The blade window includes a lock tab confined for sliding movement within a first portion of the slot and removable from the slot when aligned with a second portion of the slot to remove the blade window from the blade guard.

The disclosure provides, in one aspect, a circular saw comprising a shoe including an upper surface and an opposite, lower surface, and a saw unit. The saw unit includes a circular saw blade, a blade guard, and a transparent blade window. The saw unit is pivotably coupled to the shoe between a first position in which the saw blade does not protrude beyond the lower surface of the shoe, and a second position in which the saw blade protrudes beyond the lower surface of the shoe. The blade guard encloses a portion of the saw blade and has a cutout adjacent a bottom side of the blade guard and a slot above the cutout. The transparent blade window is configured to be received in the cutout to provide a user with a visual indication of the saw blade. The blade window includes a lock tab and a pawl. The lock tab is confined for sliding movement with a first portion of the slot and removeable from the slot when aligned with a second portion of the slot to remove the blade window from the blade guard. The pawl is configured to selectively engage the blade guard to secure the blade window to the blade guard.

The disclosure provides, in one aspect, a track saw assembly configured to make a cut in a workpiece, the track saw assembly comprising a track, a shoe, and a saw unit. The track is configured to rest upon the workpiece. The shoe includes an upper surface and an opposite, lower surface. The lower surface of the shoe is configured to be supported on the track. The saw unit is coupled to the upper surface of the shoe. The saw unit includes a circular saw blade, a blade guard, and a transparent blade window. The saw unit is pivotably coupled to the shoe between a first position in which the saw blade does not protrude beyond the lower surface of the shoe, and a second position in which the saw blade protrudes beyond the lower surface of the shoe. The blade guard encloses a portion of the saw blade and has a cutout adjacent a bottom side of the blade guard and a slot above the cutout. The blade guard includes a detent, a cutout, and a connecting slot. The transparent blade window is configured to be received in the cutout to provide a user with a visual indication of the saw blade. The blade window includes a lock tab confined for sliding movement within a first portion of the slot and removable from the slot when aligned with a second portion of the slot to remove the blade window from the blade guard.

Other features and aspects of the invention will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

Figure 1:
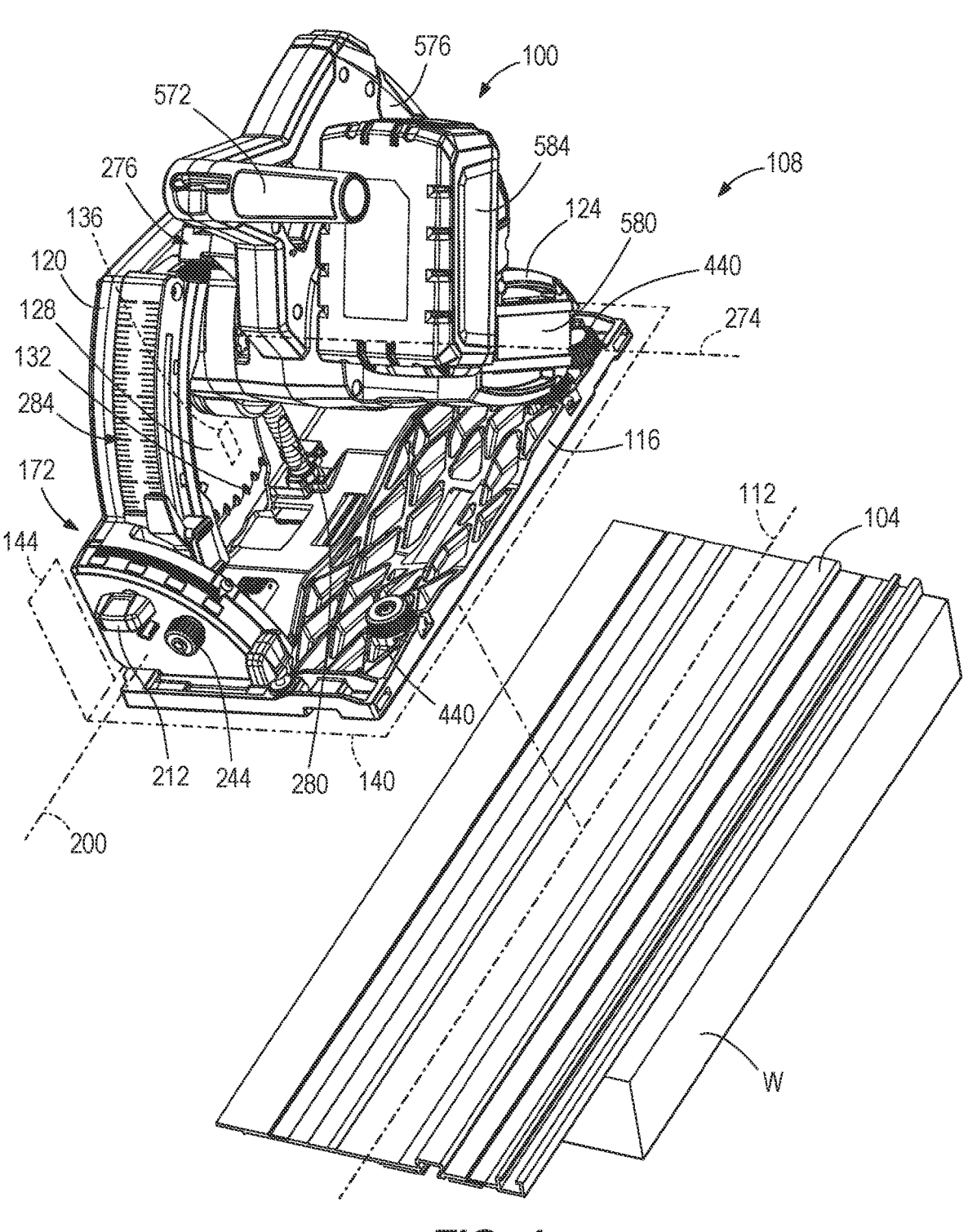
FIG. 1 is a perspective view of a track saw assembly including a track saw and a track.
Figure 2:
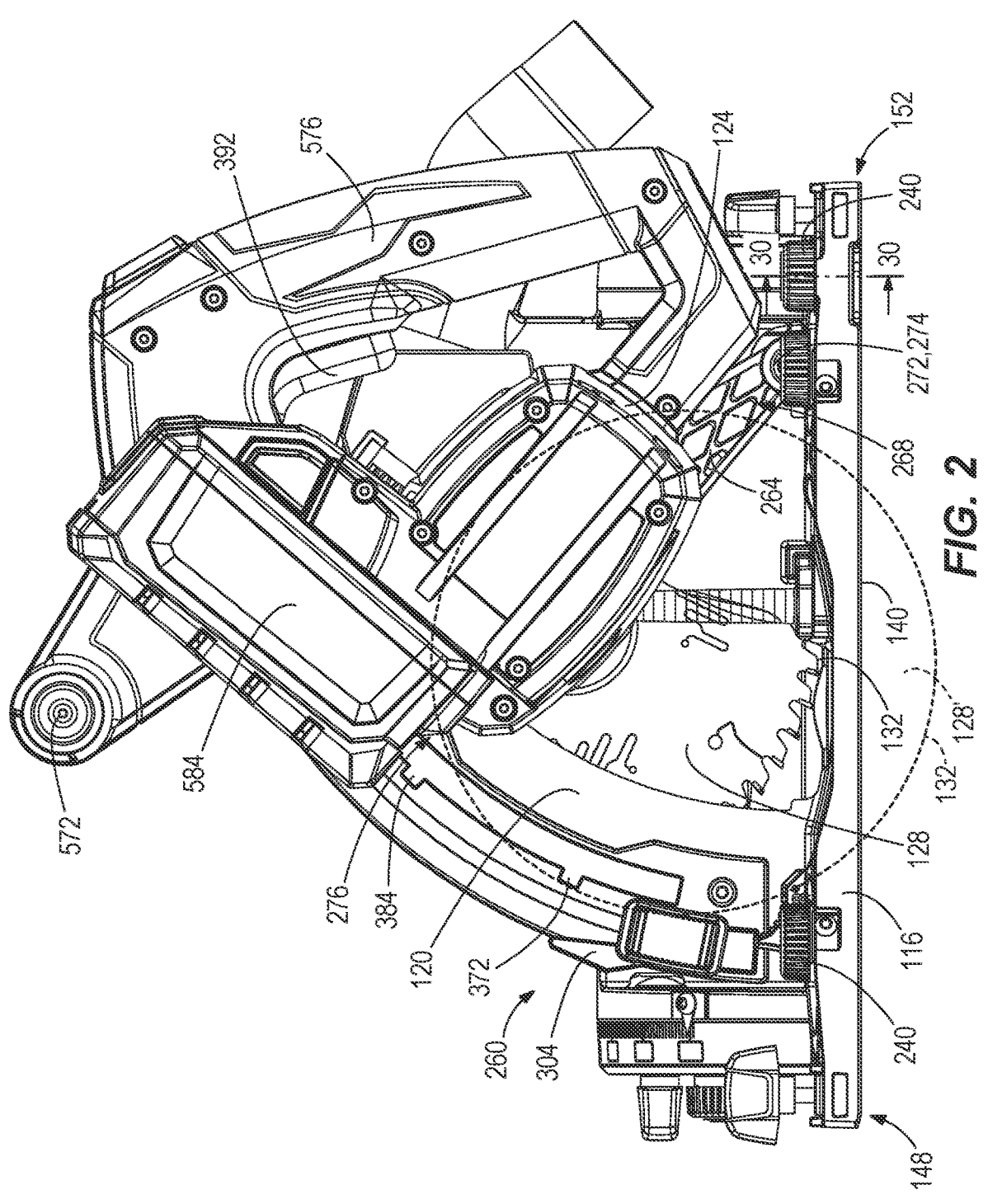
FIG. 2 is a side view of the track saw of FIG. 1.
Figure 3:
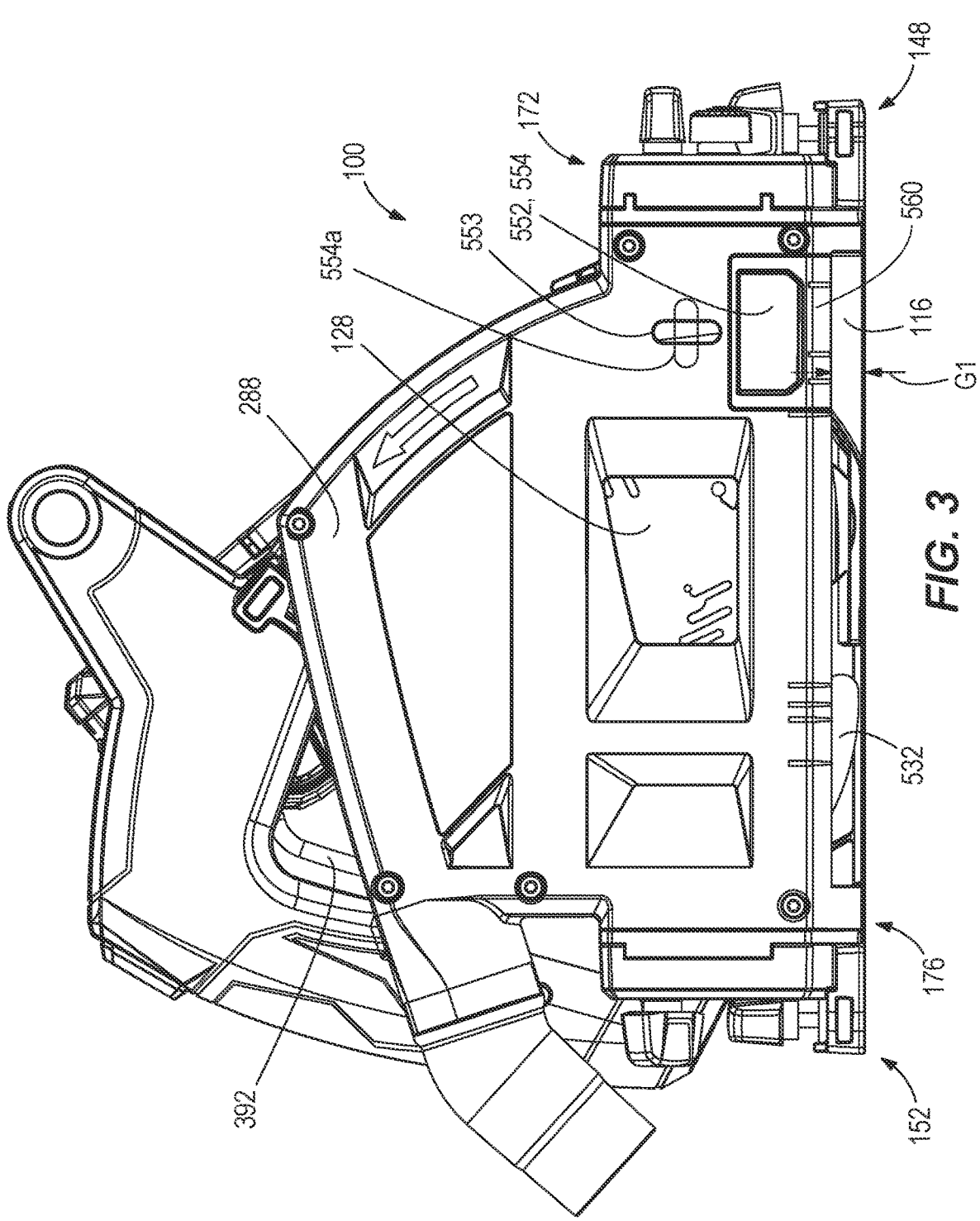
FIG. 3 is an opposite side view of the track saw of FIG. 1.

FIGS. 1-3 illustrate a plunging circular saw, such as a track saw 100, for use with a track 104. The combined track saw 100 and track 104 create a track saw assembly 108. The track saw assembly 108 may rest upon a work piece W. The track saw 100 rests upon a track body (i.e., a body) 104a of the track 104 and is translated along a longitudinal axis 112 of the track 104 to make a cut in the work piece W. The track saw 100 includes a shoe 116, an upstanding carriage 120, and a saw unit 124 supported on the shoe 116 and the carriage 120. The saw unit 124 includes a blade 128 having a lowermost portion 132. The blade 128 is generally planar and defines a blade plane 136. The track saw 100 further includes an upper blade guard 288 which at least partially encloses the saw blade 128. A bottom surface 116*a* (i.e., a lower surface 116*a*) of the shoe 116 defines a shoe plane 140. When the track 104 rests upon the work piece W, the shoe plane 140 is parallel with an upper surface of the work piece W. A vertical reference plane 144 extends perpendicularly upward from the shoe plane 140.

With continued reference to FIGS. 1-3, the saw unit 124 of the track saw 100 includes a drive unit 580 including an electric motor (e.g., a brushless electric direct-current motor 580) for providing torque to the saw blade 128 causing it to rotate. The drive unit 580 may also include a gear train or transmission between the motor 580 and the saw blade 128 to adjust the magnitude of torque transmitted to the blade 128. In the illustrated embodiment, the drive unit 580 is powered by a removable battery pack 584. However, the drive unit 580 may be powered by another power source. The track saw 100 further includes a trigger 392 configured to selectively activate the motor 580.

The track saw 100, as illustrated in FIGS. 1-3, may further include any number of additional mechanisms configured to enhance operation and/or maneuverability of the track saw 100. As illustrated in FIGS. 2-3, the shoe 116 includes a front end 148 and an opposite a rear end 152. The track saw 100 includes a front bevel hinge 172 proximate the front end 148 of the shoe 116 and a similar rear bevel hinge 176 proximate the rear end 152 of the shoe 116. Each of the bevel hinges 172, 176 combine to form a bevel angle adjustment mechanism 177. The bevel angle adjustment mechanism 177 is operable to adjust a bevel angle between the blade plane 136 and the shoe plane 140. The bevel angle may be measured with reference to the vertical reference plane 144 (FIG. 1). One or both of the bevel hinges 172, 176 includes a knob 212 that may be actuated to apply a clamping force to secure the saw unit 124 at a desired bevel angle relative to the vertical reference plane 144. In some embodiments, one or both of the bevel hinges 172, 176 may further include an actuatable intermediate bevel stop 244 configured to provide a hard stop at an intermediate bevel angle (e.g., 22.5 degrees) within the bounds of adjustment of the bevel hinges 172, 176 (e.g., between –1 degrees and 48 degrees).

With reference to FIG. 2, the track saw 100 may include a plunge depth assembly 260 permitting movement of the blade 128 between a non-plunged or retracted position (FIG. 2) in which the lowermost portion 132 of the blade 128 does not intersect the shoe plane 140 (e.g., where the saw blade does not protrude beyond the lower surface 116*a* of the shoe 116) and a plunged or extended position (illustrated with blade 128' in FIG. 2) in which the blade 128 intersects the shoe plane 140 (e.g., and protrudes beyond the lower surface 116*a* of the shoe 116) for cutting the work piece W. The plunge depth assembly 260 includes a lever arm 264 (FIG. 2) pivotably coupled at a first end 268 thereof to the shoe 116 by a pivot hinge 272. The pivot hinge 272 defines a plunge axis 274 about which the lever arm 264 is rotated. The plunge axis 274 is also illustrated in FIG. 1. The plunge axis 274 is transverse the longitudinal axis 112 of the track 104. The lever arm 264 includes a second end 276 opposite the first end 268. A compression spring 280 (FIG. 1) extends between the lever arm 264 and the shoe 116 to bias the lever arm 264 towards the retracted position.

The plunge depth assembly 260 further includes a depth scale 284 (FIG. 1) fixed to the carriage 102 adjacent the upper blade guard 288. The plunge depth assembly 260 includes a depth stop 304 which is movable along the depth scale 284 to any desired position corresponding with any desired depth of the blade 128. The second end 276 of the lever arm 264 is configured to abut the depth stop 304 when the saw unit 124 is plunged to the desired plunge depth. The plunge depth assembly 260 may be movable along the depth scale 284 to positions corresponding with any number of notches 372, 384. The notches 372, 384 may, for example, be used during assembly of the track saw 100 and/or during a blade exchange procedure of the blade 128. Additional and/or differently placed notches 372, 384 may correspond with other commonly utilized positions of the blade 128.

The track saw 100 further includes a primary handle 572 and an auxiliary handle 576 (FIGS. 1 and 2). The primary handle 572 extends generally between lateral sides of the shoe 116. The auxiliary handle 576 extends generally from the front end 148 of the shoe 116 towards the rear end 152 of the shoe 116. As such, when the auxiliary handle 576 is pressed forwards, the track saw 100 is translated along the track 104. And, when the primary handle 572 is pressed downwards, the saw unit 124 is plunged downward relative to the shoe 116. However, operation of either handle 572, 576 can translate the track saw 100 along the track 104. Additionally, operation of either handle 572, 576 can plunge the saw unit 124 relative to the shoe 116. In the illustrated embodiment, the trigger 392 is positioned on the auxiliary handle 576.

The track saw 100 may further include knobs 440 configured to adjust frictional force between the shoe 116 and the track 104. The track saw 100 may further include a riving knife 532 configured to project below the shoe 116 and follow the blade 128 within a cut of the work piece W.

With reference to FIG. 3, the upper blade guard 288 includes a slot 290 configured to couple a splinter guard 554 to the upper blade guard 288. The splinter guard 554 includes a knob 554*a* which extends through the slot 290 and is tightened to secure the splinter guard 554 against the upper blade guard 288. Tightening the knob 554*a* with a nut (not shown) on the opposite (e.g., interior) side of the upper blade guard 288 locks the splinter guard 554 in place. Optionally, upon actuation of the knob 554*a*, may press a washer (not shown) onto the slot 290, and the knob 554*a*, nut, and washer may secure the splinter guard 554 to the upper blade guard 288. The splinter guard 554 may be otherwise connected or adjustably connected to the upper blade guard 288.

Figure 4:
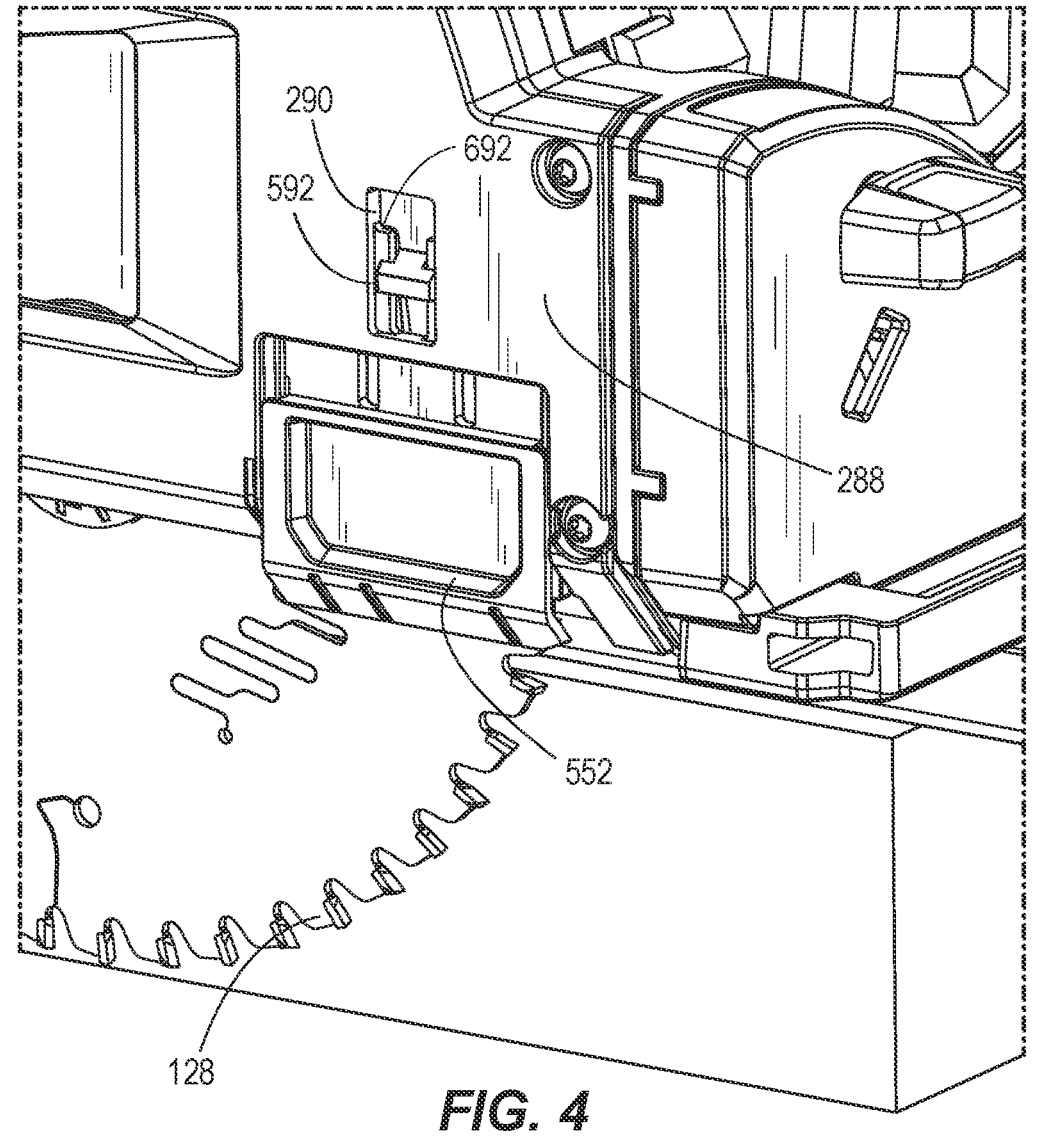
FIG. 4 is a perspective view of a transparent blade window coupled to an upper blade guard of the track saw of FIG. 1.

With reference to FIG. 4, the saw unit 124 further includes a transparent blade window 552 positioned within a cutout 652 of the upper blade guard 288. The blade window 552 is adjacent the blade 128 so that a user can see the position of the blade 128 with respect to the work piece W. The blade window 552 may also permit the user to see a rotational status (e.g., direction, speed) of the blade 128. The blade window 552 is adjustable in a vertical direction. More specifically, the blade window 552 is configured to be raised or lowered relative to the upper blade guard 288 and the work piece W. In a raised (e.g., connection/removal) position of the blade window 552, as illustrated in FIG. 3, a vertical gap G1 may exist between the body portion 560 of the blade window 552 and the bottom surface 116*a* of the shoe 116. In a first lowered position of the blade window 552, in which the saw unit 124 could be used without the track 104, a lower most surface of the body portion 560 of the blade window 552 may be positioned at a same height as the bottom surface 116*a* of the shoe 116. This first lowered position of the blade window 552 may at least partially enclose the upper blade guard 288. The blade window 552 may be movable to a second lowered position, in which the saw unit 124 could be used with the track 104, where the blade window 552 is positioned below the bottom surface 116*a* of the shoe 116. In other words, in the second lowered position, the blade window 552 is positioned in alignment with a lower surface of the track 104 that rests on the work piece W. This second lowered position of the blade window 552 may at least partially enclose the upper blade guard 288. In sum, the illustrated blade window 552 is movable between three distinct positions relative to the cutout 652. In other embodiments, the blade window 552 may be movable between only one, only two, or any number of distinct positions relative to the cutout 652. In addition to allowing the user to see the position and rotational status (e.g., direction, speed) of the blade 128, the blade window 552 can be selectively raised or lowered with respect to the work piece W to enclose the upper blade guard 288 and thus facilitate the collection of sawdust or other debris expelled from the work piece W during a cutting operation.

Figure 5:
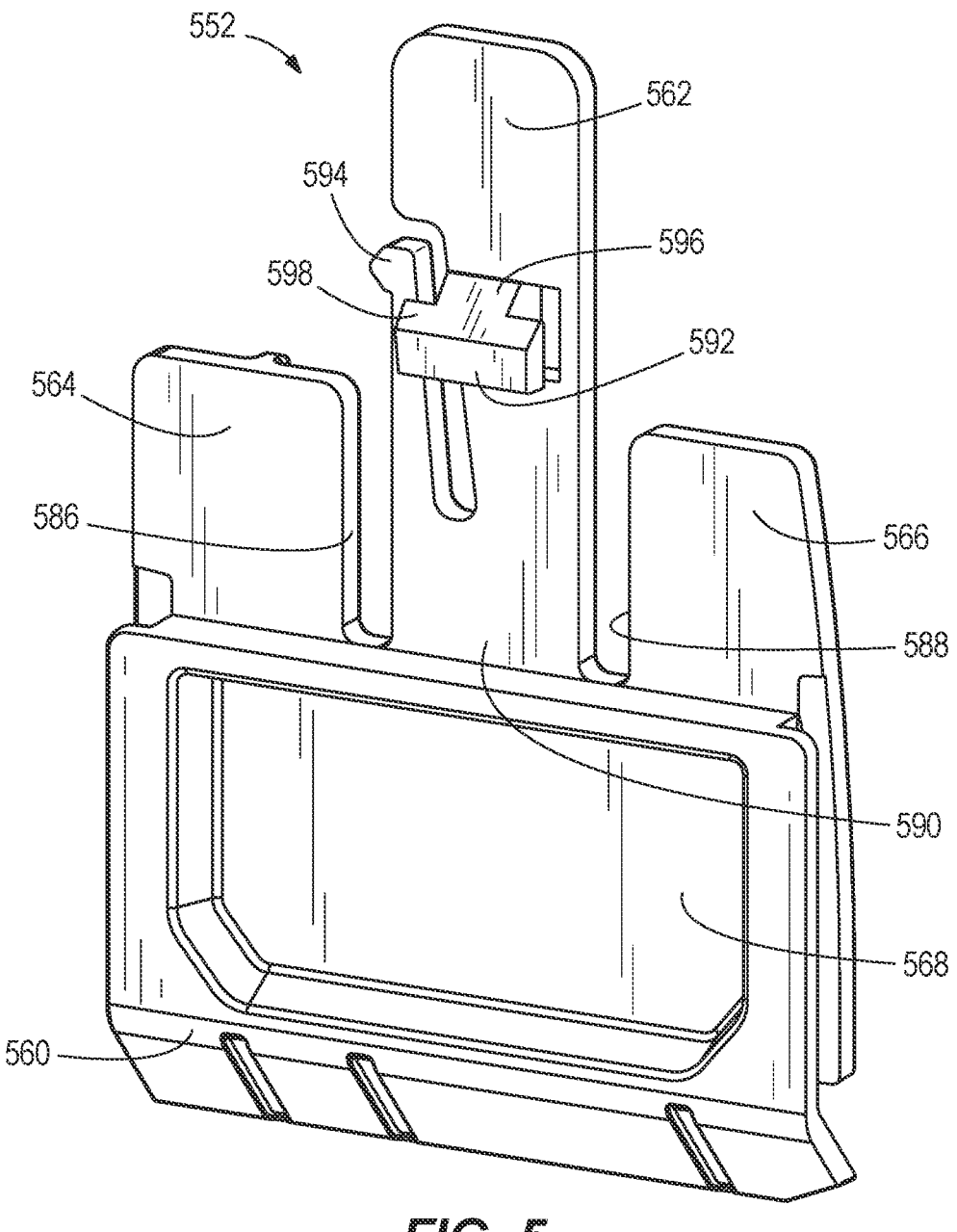
FIG. 5 is a perspective view of the transparent blade window separated from the upper blade guard of the track saw of FIG. 1.

With reference to FIG. 5, the blade window 552 includes a body portion 560 and a connecting portion 590 extending from a top side of the body portion 560. The body portion 560 includes a recess 568 configured to be graspable by the user. For example, the user may grasp the body portion 560 at the recess 568 when raising or lowering the blade window 552. The connecting portion 590 includes a middle section 562, a first side section 564 separated from the middle section 562 by a first channel 586, and a second side section 566 separated from the middle section 562 by a second channel 588. In the illustrated embodiment, the middle section 562 extends further from the body portion 560 than the first side section 564 and the second side section 566. Like the body portion 560, the connecting portion 590 is transparent and provides a line of sight to the blade 128 when the blade window 552 coupled to the upper blade guard 288.

The middle section 562 includes a lock tab 592 extending from a face of the middle section 562 in a direction that is opposite the blade 128 (e.g., laterally outwardly from the middle section 562 with respect to the longitudinal axis 112). The middle section 562 further includes a pawl 594 which extends in a direction, when coupled to the saw unit 124, parallel to the longitudinal axis 112 from the middle section 562. The lock tab 592 is includes a cross-sectional shape, when looking down from the top of FIG. 5, which is generally T-shaped. The lock tab 592 includes a broad portion 598 (i.e., a second portion) (e.g., the crosswise portion of the T-shape) and a narrow portion 596 (i.e., a first portion) (e.g., the base or stem portion of the T-shape) between the broad portion 598 and the middle section 562. The pawl 594 is cantilevered from the remainder of the middle section 562. The pawl 594, and in some embodiments the entire blade window 552, is made from a flexible material that permits the pawl 594 to deflect with respect to the remainder of the middle section 562 when sufficient force is applied to the pawl 594. In the illustrated embodiment, the pawl 594 is flexible in a direction towards and away from the middle section 562. The pawl 594, as illustrated in FIG. 5, is in a relaxed position. The pawl 594 is biased towards its relaxed position. The pawl 594 is movable inwardly towards the middle section 562. In other embodiments, similar pawls 594 may be coupled to any of the first side section 564, the second side section 566, or the middle section 562. Pawls 594 may be positioned on any surface of and may extend in any direction relative to any of the first side section 564, the second side section 566, or the middle section 562. The illustrated blade window 552 includes a single pawl 594. In other embodiments, any number of pawls 594 may be provided in any desired relative position or orientation relative to one another.

Figures 6, 7:
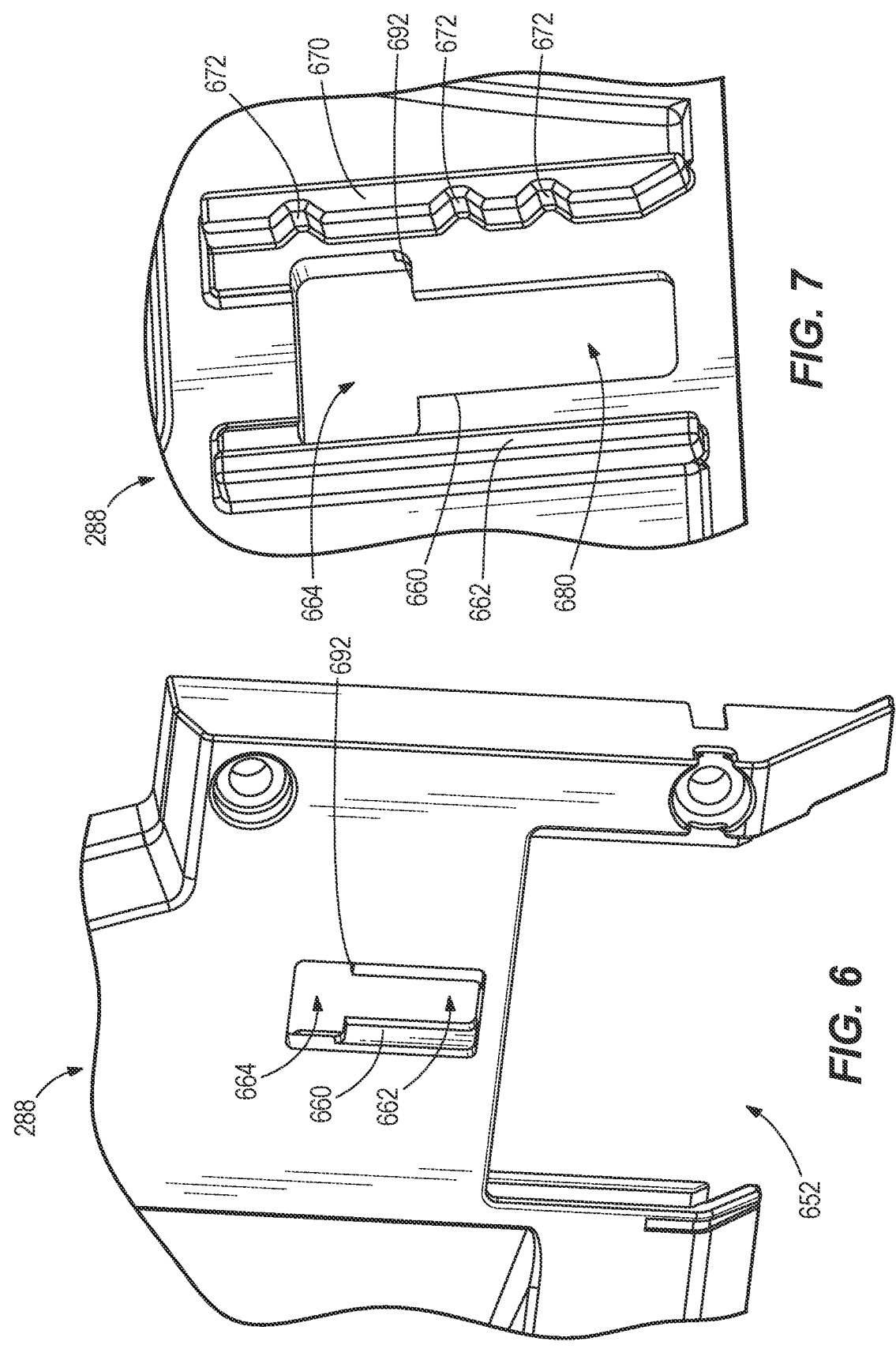
FIG. 6 is a front perspective view of a connecting slot of the upper blade guard of the track saw of FIG. 1.
FIG. 7 is a rear perspective view of the connecting slot of the upper blade guard of the track saw of FIG. 1.

With reference to FIG. 6, the upper blade guard 288 includes a cutout 652, within which the blade window 552 is disposed, and a connecting slot 660 located above the cutout 652. The connecting slot 660 is T-shaped as viewed from a lateral side of the saw unit 124. The connecting slot 660 includes a broad portion 664 and a narrow portion 662 having a nominally lesser width than the broad portion 664. The narrow portion 662 is positioned closer to the cutout 652 when compared to the broad portion 664. An interface between the narrow portion 662 and the broad portion 664 provides a resting place for the lock tab 592. The connecting slot 660 is configured to receive the lock tab 592 of the blade window 552. The narrow portion 662 of the connecting slot 660 includes a width (measured in a direction parallel to the longitudinal axis 112) which is nominally larger than the narrow portion 596 of the lock tab 592, such that the lock tab 592 can slide within the connecting slot 660. The broad portion 598 of the lock tab 592 includes a width (measured in a direction parallel to the longitudinal axis 112) which is nominally larger than the narrow portion 662 of the connecting slot 660, such that the blade window 552 cannot be removed from the connecting slot 660 when the lock tab 592 is in the narrow portion 662 of the connecting slot 660 (e.g., when the blade window 552 is lowered onto the work piece W). The broad portion 664 of the connecting slot 660 is sized nominally larger than the broad portion 598 of the lock tab 592, such that the blade window 552 can be removed from the connecting slot 660 if the blade window 552 is raised with respect to the blade guard 288 such that the broad portion 598 of the first protrusion 592 is aligned with the broad portion 664 of the connecting slot 660.

The connecting slot 660 and the lock tab 592 define cross-sectional shapes which are complementary in directions transverse to one another. In other words, the cross-sectional shapes of the connecting slot 660 and lock tab 592 permit the lock tab 592 to move along the connecting slot 660. The connecting slot 660 and lock tab 592 each are T-shaped in the illustrated embodiment. However, one or both of the connecting slot 660 and the lock tab 592 may be otherwise shaped (e.g., as L-shapes or the like). In other embodiments, the connecting slot 660 and lock tab 592 need not have the same geometry. For example, the illustrated narrow portion 662 is narrower than the broad portion 664 by including two relatively equal width flanges. In other embodiments (not shown), the T-shaped lock tab 592 may function even when a single flange defines the narrow portion 662 (e.g., with a modified connecting slot 660, not shown). Such a combination of the lock tab 592 and modified connecting slot 660 would still be complementary to one another in transverse directions. In other words, the lock tab 592 would still be capable of interaction with the modified connecting slot 660.

With reference to FIG. 7, an interior side of the upper blade guard 288 that faces the blade 128 includes a first guide rib 670 and a second guide rib 680. The first guide rib 670 and the second guide rib 680 each extend from the interior side of the upper blade guard 288 in a direction towards the blade 128. The first guide rib 670 and the second guide rib 680 also extend in a direction perpendicular to the shoe 116. When the blade window 552 is attached to the upper blade guard 288, the first guide rib 670 is received within the first channel 586 of the blade window 552 and the second guide rib 680 is received within the second channel 588 of the blade window 552. The first guide rib 670 includes a plurality of detents 672. In the illustrated embodiment, the detents 672 are oriented in a direction along the longitudinal axis 112. As such, when the blade window 552 is attached to the upper blade guard 288, the pawl 594 of the blade window 552 is received within one of the plurality of detents 672, such that the blade window 552 is inhibited from axial (e.g., upward and downward) movement with respect to the upper blade guard 288. In the presence of sufficient (e.g., upward or downward axial) force applied to the blade window 552, the pawl 594 may be deflected out of engagement with the detent 672, and the blade window 552 may be translated along the guide ribs 670, 680 between the raised and lower positions of the blade window 552. Each detent 672 is dimensioned (e.g., as a hemispherical void in the guide rib 670) so that the pawl 594 of the blade window 552 may deflect (e.g., be compressed or relaxed) with respect to the middle section 562 upon movement of the blade window 552 into or out of alignment with the detent 672. In the illustrated embodiment, the pawl 594 is configured to move to a loaded state (e.g., with the pawl 594 closest to the middle section 562) as the pawl 564 contacts the guide rib 670. Upon further sliding (e.g., translation) movement of the blade window 552 along the guide rib 670, the pawl 594 is movable to a relaxed state (e.g., FIG. 5) when aligned with any one of the detents 672. The detent 672 is shaped to hold the pawl 594 therein until receipt of sufficient upward or downward force is applied to the blade window 552. To move the blade window 552 with respect to the upper blade guard 288, the user must apply sufficient force to the blade window 552 (e.g., at the recess 568) in an upward or downward direction relative to the work piece W, to cause the pawl 594 to move out of one detent 672, such that the blade window 552 can move freely within the cutout 652 until the pawl 594 is received in an another (e.g., second) detent 672 at a different height corresponding to the another (e.g., second) detent 672.

Figures 8, 9:
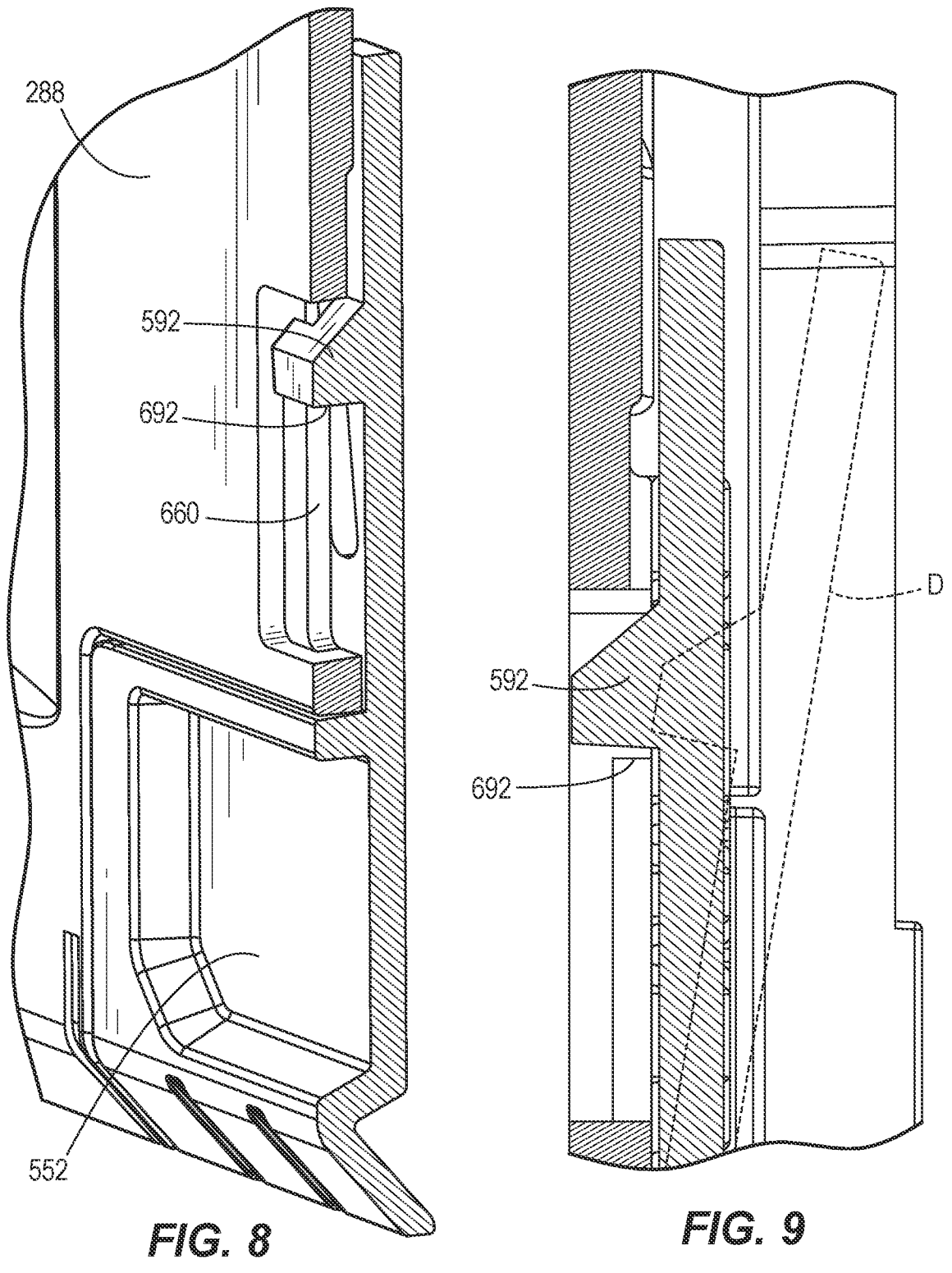
FIG. 8 is a perspective view of the blade window raised with respect to the connecting slot of the upper blade guard of the track saw of FIG. 1.
FIG. 9 is a side view illustrating a process for removing the blade window from the connecting slot of the upper blade guard of the track saw of FIG. 1.

As illustrated in FIG. 8, when the blade window 552 is in its raised position, the broad portion 598 of the lock tab 592 is aligned (in a vertical direction) with the broad portion 664 of the connecting slot 660. However, as the blade window 552 is translated downward toward the first lowered position and/or the second lowered position, the broad portion 598 of the lock tab 592 is aligned (in a vertical direction) with the narrow portion 662 of the connecting slot 660. When in either the first lowered position or the second lowered position, the lock tab 592 is inhibited from being pushed inward through the connecting slot 660 because the broad portion 598 is wider than the narrow portion 662 of the connecting slot 660. When in any lowered position, including the first lowered position and the second lowered position, any laterally inward force acting upon the lock tab 592 (i.e., towards the blade 128) will be counteracted by a corresponding normal force acting in a laterally outward-extending direction (i.e., away from the blade 128) by the upper blade guard 288.

FIGS. 8 and 9 illustrate a process for removing the blade window 552 from the upper blade guard 288. To remove the blade window 552, the blade window 552 must first be moved to the raised position with respect to the upper blade guard 288, such that the broad portion 598 of the lock tab 592 is an aligned state with the broad portion 664 of the connecting slot 660 (FIG. 8). The user must then apply a laterally inward-extending force (i.e., towards the blade plane 136) to the lock tab 592 with a sufficient magnitude (e.g., greater than 50 Newtons) to deflect the middle section 562 (as shown in the deflected state D in FIG. 9) and move the lock tab 592 out of alignment with a lip 692 (FIG. 8) formed at the interface between the narrow portion 662 of the connecting slot 660 and the broad portion 664 of the connecting slot 660. When the lock tab 592 no longer overlaps the lip 692 as shown in the deflected state D of FIG. 9, the user can then lower the blade window 552 through the cutout 652 and eventually remove the blade window 552 from the upper blade guard 288.

Although the invention has been described in detail with reference to certain preferred embodiments, variations and modifications exist within the scope and spirit of one or more independent aspects of the invention as described.

Various features of the invention are set forth in the following claims.

What is claimed is:

1. A circular saw comprising:
   a shoe including an upper surface and an opposite, lower surface; and
   a saw unit including
   a circular saw blade, the saw unit pivotably coupled to the shoe between a first position in which the saw blade does not protrude beyond the lower surface of the shoe, and a second position in which the saw blade protrudes beyond the lower surface of the shoe,
   a blade guard enclosing a portion of the saw blade and having a cutout adjacent a bottom side of the blade guard and a slot above the cutout, the slot defining a first dimension and a different second dimension, and
   a transparent blade window configured to be received in the cutout to provide a user with a visual indication of the saw blade, the blade window including a lock tab confined for sliding movement within the first dimension of the slot and removable from the slot when aligned with the second dimension of the slot to remove the blade window from the blade guard.

2. The circular saw of claim 1, wherein the blade window is configured to be coupled to the blade guard in at least two distinct positions relative to the cutout.

3. The circular saw of claim 2, wherein the blade window is translated between the two distinct positions.

4. The circular saw of claim 1, wherein the blade guard includes a detent and the blade window is movable into engagement with the detent.

5. The circular saw of claim 4, wherein the blade window includes a pawl configured to engage the detent to hold the blade window in position relative to the cutout, wherein the pawl is made from a flexible material, and is movable between a loaded state and a relaxed state in which the pawl engages the detent.

6. The circular saw of claim 1, wherein the slot includes a lip at an interface between the first dimension and the second dimension, the lock tab not overlapping the lip when aligned with the second dimension.

7. A circular saw comprising:
   a shoe including an upper surface and an opposite, lower surface; and
   a saw unit including
   a circular saw blade, the saw unit pivotably coupled to the shoe between a first position in which the saw blade does not protrude beyond the lower surface of the shoe, and a second position in which the saw blade protrudes beyond the lower surface of the shoe,
   a blade guard enclosing a portion of the saw blade and having a cutout adjacent a bottom side of the blade guard and a slot above the cutout, the slot defining a first dimension and a different second dimension, and
   a transparent blade window configured to be received in the cutout to provide a user with a visual indication of the saw blade, the blade window includes a lock tab confined for sliding movement within the first dimension of the slot and removable from the slot when aligned with the second dimension of the slot to remove the blade window from the blade guard; and a pawl configured to selectively engage the blade guard to secure the blade window to the blade guard.

8. The circular saw of claim 7, wherein the slot includes a lip formed at an interface between the first dimension and the second dimension of the slot, the second dimension having a width greater than the first dimension.

9. The circular saw of claim 8, wherein the pawl is made from a flexible material such that the pawl may deflect with respect to the blade window.

10. The circular saw of claim 7, wherein the slot and the lock tab define cross-sectional geometries which are complementary in directions transverse one another.

11. The circular saw of claim 7, wherein the blade guard includes a guide rib configured to be received in a channel of the blade window.

12. The circular saw of claim 11, wherein the blade guard includes a detent is positioned on the guide rib.

13. The circular saw of claim 11, wherein the blade window includes a middle section and a side section separated from the middle section by the channel.

14. The circular saw of claim 11, further comprising a second guide rib configured to be received in a second channel of the blade window.

15. A track saw assembly configured to make a cut in a work piece, the track saw assembly comprising:

a track configured to rest upon the work piece;

a shoe including an upper surface and an opposite, lower surface, the lower surface of the shoe configured to be supported on the track; and a saw unit coupled to the upper surface the shoe, the saw unit including a circular saw blade, the saw unit pivotably coupled to the shoe between a first position in which the saw blade does not protrude beyond the lower surface of the shoe, and a second position in which the saw blade protrudes beyond the lower surface of the shoe, a blade guard enclosing a portion of the saw blade and having a cutout adjacent a bottom side of the blade guard and a slot above the cutout, the slot defining a first dimension and a different second dimension, and a transparent blade window configured to be received in the cutout to provide a user with a visual indication of the saw blade, the blade window including a lock tab confined for sliding movement within the first dimension of the slot and removable from the slot when aligned with the second dimension of the slot to remove the blade window from the blade guard.

16. The track saw assembly of claim 15, wherein the blade window is configured to be coupled to the blade guard in at least three distinct positions relative to the cutout.

17. The track saw assembly of claim 16, wherein the three positions include a raised position, a first lowered position, and a second lowered position, the raised position permitting removal of the blade window from the blade guard.

18. The track saw assembly of claim 17, wherein the first lowered position aligns the blade window with the lower surface of the shoe.

19. The track saw assembly of claim 15, wherein the lock tab is configured to be coupled to the blade guard in a position that aligns the blade window with a lower surface of the track that rests on the work piece.

20. The circular saw of claim 1, wherein the slot includes a narrow portion defining the first dimension and a broad portion defining the second dimension, the narrow portion having a nominally lesser width than the broad portion.

\* \* \* \* \*